United States Patent
Chen et al.

(10) Patent No.: US 8,213,904 B2
(45) Date of Patent: Jul. 3, 2012

(54) METHOD AND APPARATUS FOR PROVISIONING AN ELECTRONIC COMMUNICATION DEVICE VIA A MOBILE INTERNET PROTOCOL REGISTRATION

(75) Inventors: Shuang-Hui Chen, Nanjing (CN); Wen-Gang Wu, Nanjing (CN); Wei-Xiao Zhang, Nanjing (CN)

(73) Assignee: Motorola Mobility, Inc., Libertyville, IL (US)

( * ) Notice: Subject to any disclaimer, the term of this patent is extended or adjusted under 35 U.S.C. 154(b) by 1060 days.

(21) Appl. No.: 12/115,782

(22) Filed: May 6, 2008

(65) Prior Publication Data
US 2009/0280776 A1 Nov. 12, 2009

(51) Int. Cl.
*H04W 12/08* (2009.01)
(52) U.S. Cl. ........................................ 455/411; 370/401
(58) Field of Classification Search .................. 55/411; 554/411
See application file for complete search history.

(56) References Cited

U.S. PATENT DOCUMENTS

| 6,658,251 | B1* | 12/2003 | Lee et al. ................... 455/435.1 |
| 7,173,905 | B1* | 2/2007 | Alex et al. ...................... 370/230 |
| 2003/0035409 | A1* | 2/2003 | Wang et al. .................. 370/349 |
| 2003/0091013 | A1* | 5/2003 | Song et al. .................... 370/338 |
| 2003/0220107 | A1 | 11/2003 | Lioy et al. |
| 2005/0141527 | A1* | 6/2005 | Gateva et al. ................. 370/401 |
| 2008/0046988 | A1* | 2/2008 | Baharis et al. ..................... 726/7 |

* cited by examiner

*Primary Examiner* — Dwayne Bost
*Assistant Examiner* — Joseph Dean, Jr.

(57) ABSTRACT

A method for updating wireless application protocol (WAP) data at an electronic communication device during a mobile internet protocol (MIP) registration process includes processing at an authentication, authorization, and accounting (AAA) server a first access request message that identifies the electronic device (step 805). It is then determined that the electronic device requires updated WAP provisioning (step 810). The AAA server is then changed to a WAP provisioning ongoing state (step 815). An access reject message including updated WAP provisioning data is then transmitted from the AAA server (step 820). A second access request message, including the updated WAP provisioning data is then verified at the AAA server (step 830). The AAA server is then changed to a WAP provisioning valid state (step 835). Finally, an access accept message is transmitted from the AAA server (step 840).

18 Claims, 8 Drawing Sheets

| | | | |
|---|---|---|---|
| LENGTH: (BYTES) | 512 = (4+2+506) | | |
| VENDOR/ORG-ID: | ACCORDING TO RFC1700, HIGH-ORDER OCTET IS 0 AND LOW ORDER OCTETS ARE THE SMI NETWORK MANAGEMENT PRIVATE ENTERPRISE CODE OF THE VENDOR IN THE NETWORK BYTE ORDER. FOR EXAMPLE, ABC WIRELESS VENDOR ID: 12951 | | |
| VENDOR-CVSE-TYPE: | 51 (VENDOR SPECIFIC, VENDORS CAN ASSIGN OTHER APPROPRIATE VALUES TO IT) | | |
| VENDOR-CVSE-VALUE: | COMPRISES OF THE FOLLOWING ITEMS(IN BYTES) | | |
| | WPvMR VERSION | 1 | ~505 |
| | HOME PAGE | 128 | ~510 |
| | MMSC | 128 | ~515 |
| | USER NAME | 32 | ~520 |
| | PASSWORD | 32 | ~525 |
| | GATEWAY AUTHENTICATION TYPE | 1 | ~530 |
| | 1ST GATEWAY IP ADDRESS | 4 | ~535 |
| | 1ST GATEWAY: SERVICE TYPE | 1 | ~540 |
| | 1ST GATEWAY: PRIMARY PORT | 2 | ~545 |
| | 1ST GATEWAY: E2E PORT | 2 | ~550 |
| | 1ST GATEWAY: IXI PORT | 2 | ~555 |
| | 2ND GATEWAY IP ADDRESS | 4 | ~560 |
| | 2ND GATEWAY: SERVICE TYPE | 1 | ~565 |
| | 2ND GATEWAY: PRIMARY PORT | 2 | ~570 |
| | 2ND GATEWAY: E2E PORT | 2 | ~575 |
| | 2ND GATEWAY: IXI PORT | 2 | ~580 |
| | RESERVED: | 162 | ~590 |
| | SUM(BYTES) | 506 | |

*FIG. 5*

METHOD AND APPARATUS FOR PROVISIONING AN ELECTRONIC COMMUNICATION DEVICE VIA A MOBILE INTERNET PROTOCOL REGISTRATION

FIELD OF THE INVENTION

The present invention relates generally to mobile communication devices, and in particular, but not exclusively, to wireless application protocol (WAP) provisioning of a device via a mobile internet protocol (MIP) registration process.

BACKGROUND

Mobile communication devices such as mobile phones have evolved from relatively simple voice-only radio devices to sophisticated multimedia devices. Mobile phones now frequently include numerous features such as Internet browsers, cameras, electronic calendars, and multi-media players. Operating such features often requires complex software applications, called firmware, to reside on a mobile communication device.

Maintaining and updating firmware on mobile communication devices can be a difficult process. Conventional software applications, such as those residing on personal computers, are frequently able to schedule automatic software updates using the Internet, and the updates thus can be transparent and convenient for computer users. However, firmware updates for mobile communication devices have often required manufacturer recalls of devices, or hard wiring of the devices to the Internet at a service facility, both of which can be very inconvenient for device users and expensive for mobile service providers.

Firmware Over-The-Air (FOTA) is a technology that enables device manufacturers and/or service providers to update a mobile device's firmware using wireless communications. Wireless provisioning of firmware using FOTA techniques has many advantages including improved time to market, faster deployment of security patches and anti-virus updates, reduced recall and service costs, faster adoption of new applications, and improved customer satisfaction.

In conjunction with FOTA provisioning, Wireless Application Protocol (WAP) provisioning enables mobile devices to be provisioned over the air with connectivity and application access information. Standards such as the Open Mobile Alliance Client Provisioning (OMACP) standards define how initial configuration parameters can be delivered to a WAP mobile device from a bootstrap server when the device first connects to a network. The standards enable provisioning documents such as binary eXtensible Markup Language (XML) documents to be delivered to a mobile device.

However, WAP provisioning generally requires numerous new hardware elements to be installed in a network, requires assistance from various client side applications, and cannot be easily launched when a device is operating in a foreign network.

BRIEF DESCRIPTION OF THE DRAWINGS

In order that the invention may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where:

FIG. 5 is a block diagram illustrating a provisioning component of a registration response message including mobile internet protocol (MIP) critical vendor/organization-specific extensions (CVSEs), according to some embodiments of the present invention.

Figure 1:
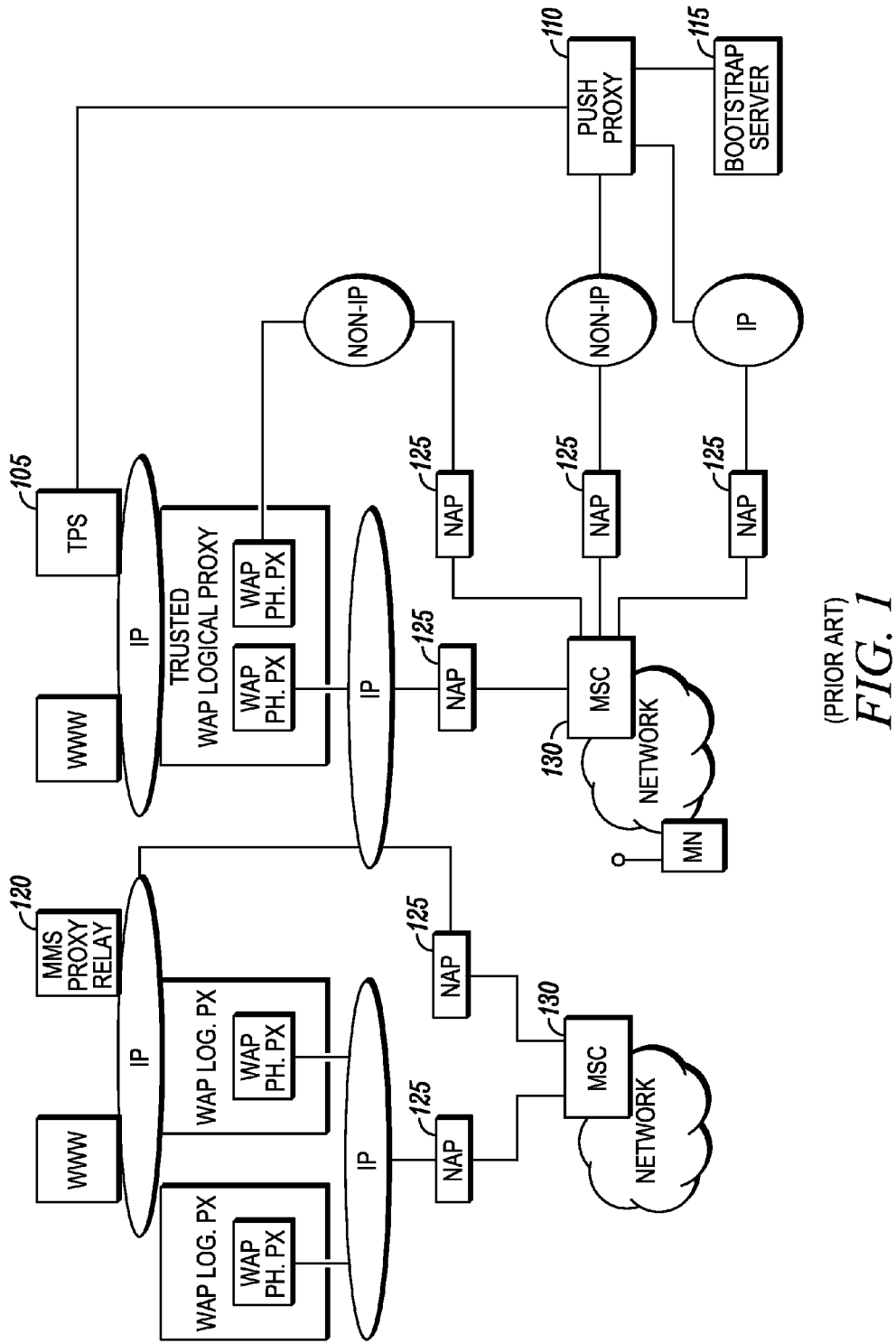
FIG. 1 is a wireless communication network topology diagram illustrating numerous network elements that are employed during wireless application protocol (WAP) provisioning, according to Open Mobile Alliance (OMA) standards of the prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to updating wireless application protocol (WAP) data at an electronic device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIG. 1, a wireless communication network topology diagram illustrates numerous network elements that are employed during wireless application protocol (WAP) provisioning according to Open Mobile Alliance (OMA) standards of the prior art. Such elements include a trusted provisioning server (TPS) 105, a push proxy element 110, a bootstrap server 115, and a multimedia messaging service (MMS) proxy-relay 120. Other standard network elements shown include network access providers 125 and mobile switching centers 130. The need for such a complex network topology to perform OMA WAP provisioning adds significant network operating costs, and can make it difficult to launch provisioning services from foreign networks.

However, according to some embodiments of the present invention, WAP provisioning can occur directly between a mobile node (MN) and an authentication, authorization and accounting (AAA) server at an internet protocol (IP) layer. There is therefore no need to deploy network elements such as a trusted provisioning server (TPS) 105, a push proxy element 110, a bootstrap server 115, and a multimedia messaging service (MMS) proxy-relay 120.

According to one aspect, the present invention comprises a method for updating WAP data at an electronic communication device such as a mobile phone. For example, the electronic communication device may be operatively connected to a code division multiple access (CDMA) radio transmission technology network or to an evolution-data optimized network. The method includes processing at a packet data serving node (PDSN) a first registration request message received from the electronic communication device. The PDSN then transmits to an authentication, authorization, and accounting (AAA) server, in response to the first registration request message, a first access request message. When the AAA server replies with an access rejection, the PDSN then transmits a first registration response message, where the first registration response message comprises WAP provisioning data for updating the WAP data at the electronic communication device. The PDSN then processes a second registration request message received from the electronic communication device and transmits to the AAA server, in response to the second registration request message, a second access request message. Finally, the PDSN transmits to the electronic communication device, in response to an acceptance of the second access request message, a second registration response message, where the second registration response message indicates that a mobile internet protocol (MIP) registration process for the electronic communication device was successful.

Some embodiments of the present invention therefore enable a more efficient method for provisioning WAP settings over the air without interaction from network users. Network operators are therefore able to dynamically reconfigure WAP settings of electronic communication devices operating in their network. Further, the method can be easily launched from foreign networks that obtain permission from a home network. Also, there is no need to solicit assistance from device applications, such as those used in conventional OMA WAP provisioning procedures. The types of WAP provisioning data that can be updated according to the present invention include, for example, proxy addresses, home page addresses, network application interface (NAI) passwords, multimedia message service center (MMSC) data, and primary port identifications.

Figure 2:
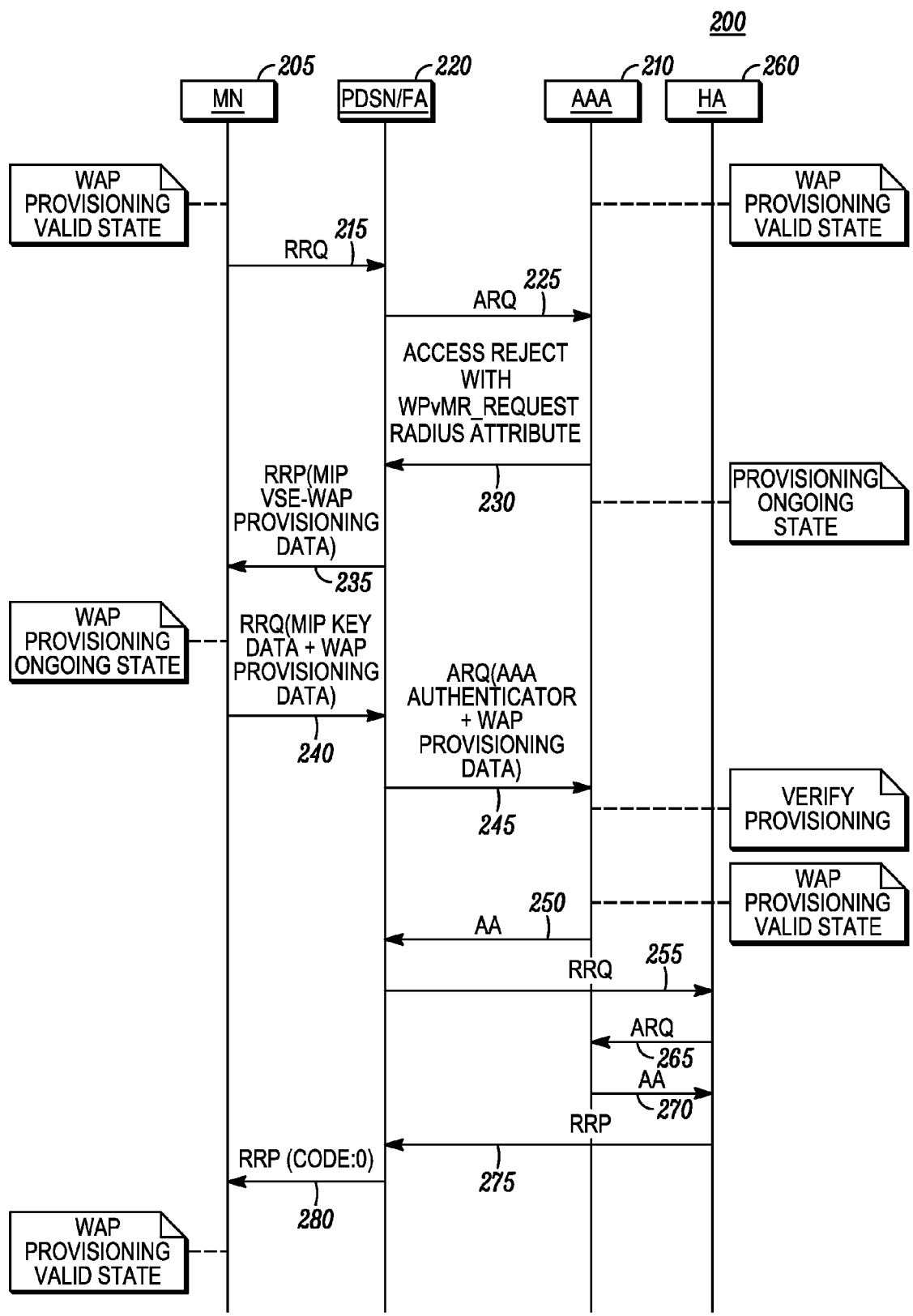
FIG. 2 is a message sequence chart illustrating a method for updating WAP data at an electronic communication device operating in a wireless communication network, according to some embodiments of the present invention.

Referring to FIG. 2, a message sequence chart illustrates a method for updating wireless application protocol (WAP) data at an electronic communication device operating in a wireless communication network 200, according to some embodiments of the present invention. Initially, the electronic communication device, namely a mobile node (MN) 205, and a AAA server 210 are operating in a WAP provisioning valid state. The MN 205 then transmits a first registration request (RRQ) message 215 to a packet data serving node/foreign agent (PDSN/FA) 220. In response, the PDSN/FA 220 converts the first RRQ message 215 to a first access request (ARQ) message 225 and transmits the first ARQ message 225 to the AAA server 210.

Next, the AAA server 210 checks a WAP provisioning state of the MN 205 and determines that the MN 205 requires updated WAP provisioning. The AAA server 210 therefore transmits an access reject message 230 back to the PDSN/FA 220, where the access reject message 230 includes updated WAP provisioning data. Further, the AAA server 210 sets itself to a WAP provisioning ongoing state.

The PDSN/FA 220 then transmits to the MN 205 a first registration response (RRP) message 235 that includes both a vendor specific error code, such as error code 51, and the updated WAP provisioning data. The MN 205 then parses the updated WAP provisioning data, stores the data in a temporary memory, and sets itself to a WAP provisioning ongoing state.

Next, the MN 205 transmits a second RRQ message 240 to the PDSN/FA 220. For verification purposes, the second RRQ message 240 includes MIP key data plus the updated WAP provisioning data. The PDSN/FA 220 then converts the second RRQ message 240 to a second ARQ message 245 and transmits the second ARQ message 245 to the AAA server 210. The AAA server 210 then verifies that the updated WAP provisioning data included in the second ARQ message 245 is correct. If so, the AAA server 210 sets itself to a WAP provisioning valid state, and transmits an access accept (AA) message 250 to the PDSN/FA 220.

In response to the AA message 250, the PDSN/FA 220 forwards, through the AAA server 210, a corresponding RRQ message 255 to a home agent (HA) 260. The HA 260 then converts the corresponding RRQ message 255 to a corresponding ARQ message 265, and transmits the corresponding ARQ message 265 to the AAA server 210. The AAA server 210 then authenticates the corresponding ARQ message 265 and, if the authentication is successful, transmits an access accept (AA) message 270 back to the HA 260. (Note that if the authentication is not successful, then another access reject message, identical to the access reject message 230, is transmitted from the AAA server 210 to the PDSN/FA 220, and the process defined by messages 235, 240, and 245 is repeated until authentication is successful.)

Next, the HA 260 converts the AA message 270 to a registration response (RRP) message 275 and transmits the RRP message 275 to the PDSN/FA 220. The RRP message 275 includes a code (e.g., code=0) that indicates a successful mobile internet protocol (MIP) registration. The PDSN/FA 220 then transmits a corresponding second RRP message 280 to the MN 205. Finally, the MN 205 stores the updated WAP provisioning data in a permanent memory and sets itself to a WAP provisioning valid state.

Figure 3:
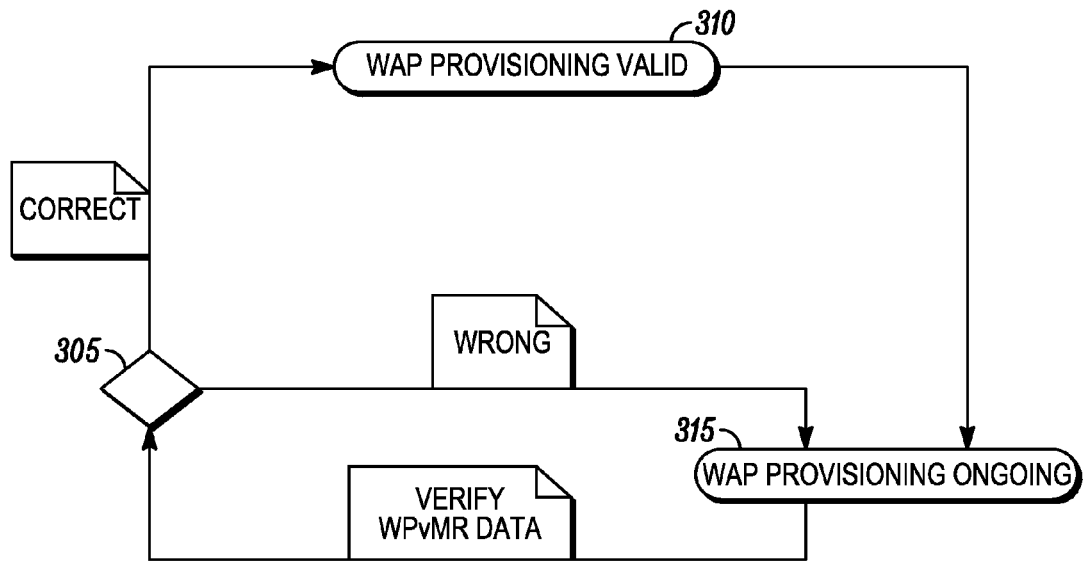
FIG. 3 is a state diagram illustrating provisioning states of a Radius authentication, authorization, and accounting (AAA) server during a method for updating WAP data at an electronic communication device, according to some embodiments of the present invention.

Referring to FIG. 3, a state diagram illustrates provisioning states of a Radius AAA server, such as the AAA server 210, during a method for updating wireless application protocol (WAP) data at an electronic communication device, such as the mobile node 205, according to some embodiments of the present invention. At block 305 it is determined at the AAA server whether WAP provisioning data included in a registration request (RRQ) message and corresponding access request (ARQ) message are correct. If so, then at block 310 the AAA server enters a WAP provisioning valid state; if not, then at block 315 the AAA server maintains or enters a WAP provisioning ongoing state. For example, the determination at block 305 is made after the AAA server 210 receives the second ARQ message 245 from the PDSN/FA 220, as shown in FIG. 2.

Figure 4:
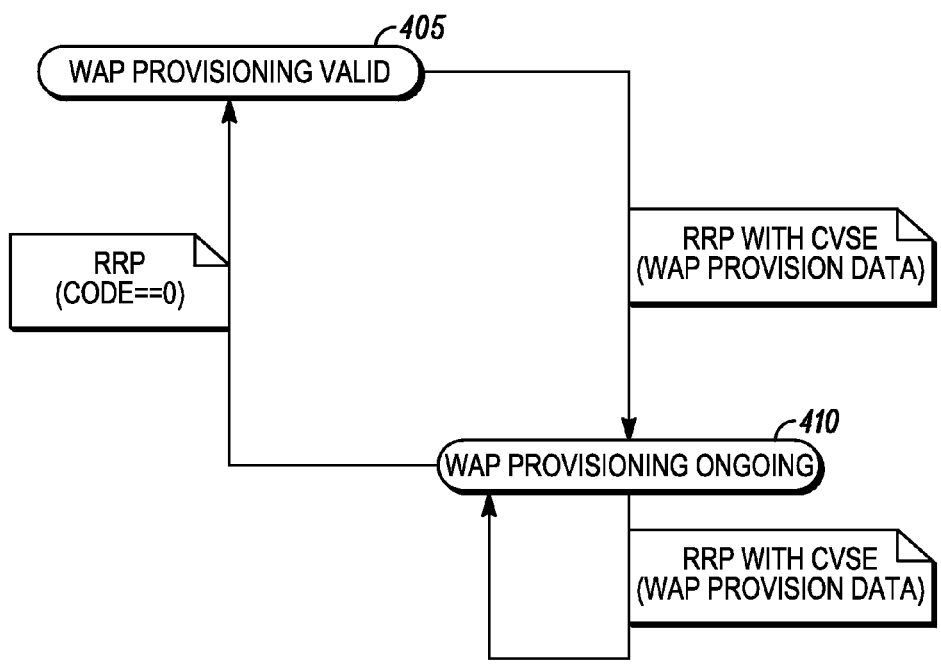
FIG. 4 is a state diagram illustrating provisioning states of an electronic communication device during a method for updating WAP data at the electronic communication device, according to some embodiments of the present invention.

Referring to FIG. 4, a state diagram illustrates provisioning states of an electronic communication device, such as the mobile node 205, during a method for updating wireless application protocol (WAP) data at the electronic communication device, according to some embodiments of the present invention. At block 405 the electronic communication device operates in a WAP provisioning valid state. At block 410, after receiving a registration response (RRP) message that includes WAP provisioning data, the electronic communication device is changed to a WAP provisioning ongoing state. If a subsequent RRP message is received that includes a code (e.g., code=0) that indicates a successful mobile internet protocol (MIP) registration, then the electronic communication device again returns to a WAP provisioning valid state.

Referring to FIG. 5, a block diagram illustrates a provisioning component 500 of a registration response message including mobile internet protocol (MIP) critical vendor/organization-specific extensions (CVSEs), according to some embodiments of the present invention. For example, the provisioning component 500 may be included in the first RRP message 235 shown in FIG. 2. As is known by those having ordinary skill in the art, CVSEs are used in numerous types of messages and are further defined in the Internet Engineering Task Force (IETF) request for comments (RFC) 3115.

The provisioning component 500 includes the following fields: A wireless application protocol provisioning via mobile internet protocol registration (WPvMR) version field 505. A home page field 510, which for example can be an absolute path such as http://www.xxxxxx.com of a session internet home page address, or an alias such as proxy:home that is a session proxy address parsed by a hypertext transfer protocol (HTTP)/WAP proxy. A multimedia messaging service center (MMSC) address field 515. A user name field 520, which for example can be defined by a carrier as username@<carrier>.com. A password field 525. A gateway authentication type field 530, which for example can be an HTTP/WAP proxy that has two types of authentication: 1. Basic and 2. Proxy. A first gateway IP address field 535, which for example can be an actual IP address such as 10.0.0.100 or an alias such as proxy <carrier>. A first gateway service type field 540, which for example can be used to define two types of services: 1. WAP and 2. HTTP. A first gateway primary port identification field 545, which for example identifies an HTTP port 80. A first gateway e2e port identification field 550, which defines an e2e port number such as 443 of a proxy. A first gateway 1×1 port identification field 555, which defines an 1×1 port number such as 8080 of a proxy. A second gateway IP address field 560. A second gateway service type field 565. A second gateway primary port identification field 570. A second gateway e2e port identification field 575. A second gateway 1×1 port identification field 580. A reserved field 590.

Figure 6:
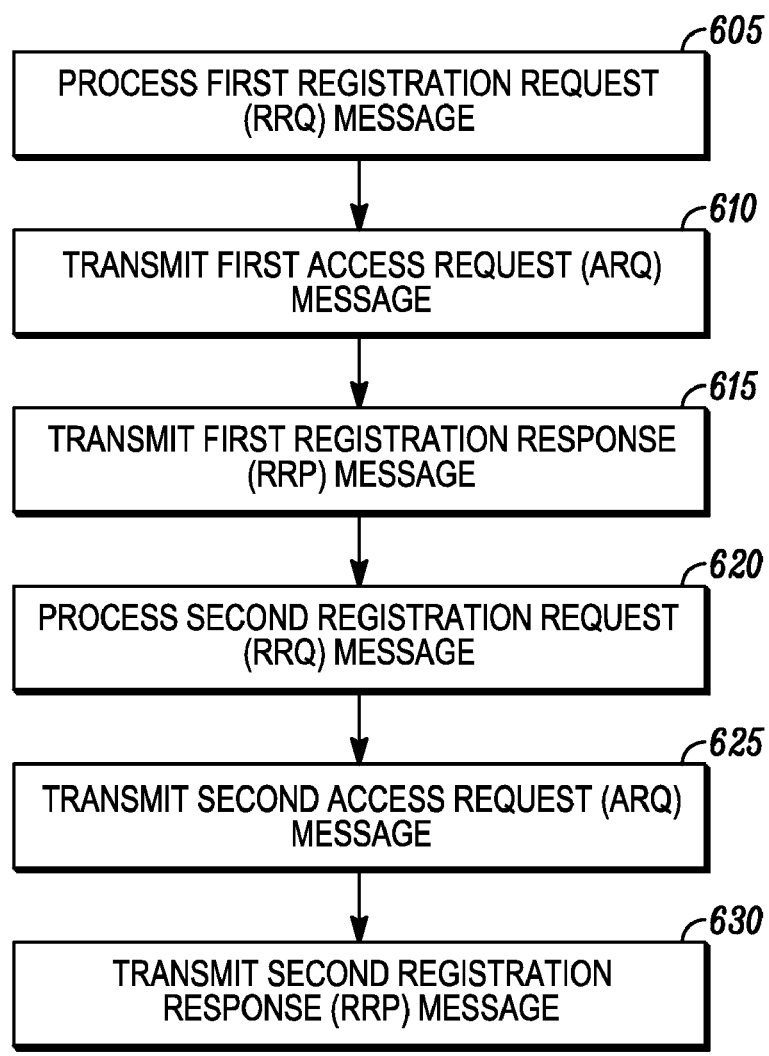
FIG. 6 is a general flow diagram illustrating a method for updating WAP data at an electronic communication device, from the perspective of a packet data serving node, according to some embodiments of the present invention.

Referring to FIG. 6, a general flow diagram illustrates a method 600 for updating wireless application protocol data at an electronic communication device, from the perspective of a packet data serving node, according to some embodiments of the present invention. At step 605, a first registration request message received from the electronic communication device is processed at a packet data serving node. For example, as described above concerning FIG. 2, the first RRQ message 215 received from the MN 205 is processed at the PDSN/FA 220.

At step 610, the packet data serving node transmits to an authentication, authorization, and accounting server, in response to the first registration request message, a first access request message. For example, the PDSN/FA 220 transmits the first ARQ message 225 to the AAA server 210.

At step 615, the packet data serving node transmits to the electronic communication device a first registration response message, in response to an access rejection by the authentication, authorization, and accounting server of the first registration request message, wherein the first registration response message comprises wireless application protocol provisioning data for updating the wireless application protocol data at the electronic communication device. For example, the PDSN/FA 220 transmits the first RRP message 235 to the MN 205.

At step 620, the packet data serving node processes a second registration request message received from the electronic communication device. For example, the PDSN/FA 220 processes the second RRQ message 240 received from the MN 205.

At step 625, the packet data serving node transmits to the authentication, authorization, and accounting server, in response to the second registration request message, a second access request message. For example, the PDSN/FA 220 transmits to the AAA server 210 the second ARQ message 245.

At step 630, the packet data serving node transmits to the electronic communication device, in response to an acceptance of the second access request message, a second registration response message, wherein the second registration response message indicates that a mobile internet protocol registration process for the electronic communication device was successful. For example, the PDSN/FA 220 transmits to the MN 205 the second RRP message 280, which indicates that a MIP registration process for the MN 205 was successful.

Figure 7:
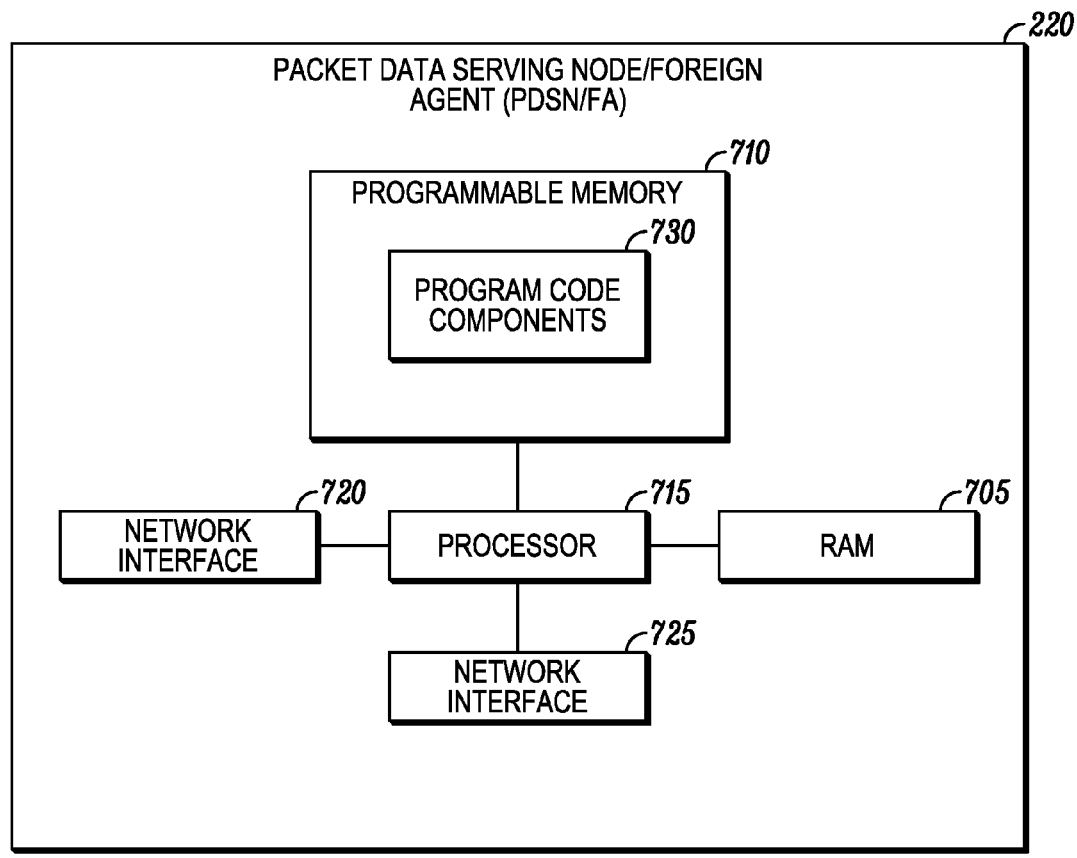
FIG. 7 is a block diagram illustrating components of a packet data serving node/foreign agent (PDSN/FA), according to some embodiments of the present invention.

Referring to FIG. 7, a block diagram illustrates components of the packet data serving node/foreign agent (PDSN/FA) 220, according to some embodiments of the present invention. According to the present specification, a packet data serving node/foreign agent is understood broadly to include both specific PDSN/FA components of CDMA2000 mobile networks, and also any type of intermediate network device that transfers communications between an electronic communication device and an authentication, authorization, and accounting (AAA) server. The PDSN/FA 220 comprises a random access memory (RAM) 705 and a programmable memory 710 that are coupled to a processor 715. The processor 715 also has ports for coupling to wireless network interfaces 720, 725. The wireless network interfaces 720, 725 can be used to enable the PDSN/FA 220 to communicate with other network elements. For example, the PDSN/FA 220 can communicate with MN 205 and the AAA server 210 using the wireless network interfaces 720, 725 to receive and transmit data packets.

The programmable memory 710 can store operating code (OC) for the processor 715 and code for performing functions associated with the PDSN/FA 220. For example, the programmable memory 710 can comprise computer readable program code components 730 configured to cause execution of the method 600 for updating wireless application protocol data at an electronic communication device as described herein.

Figure 8:
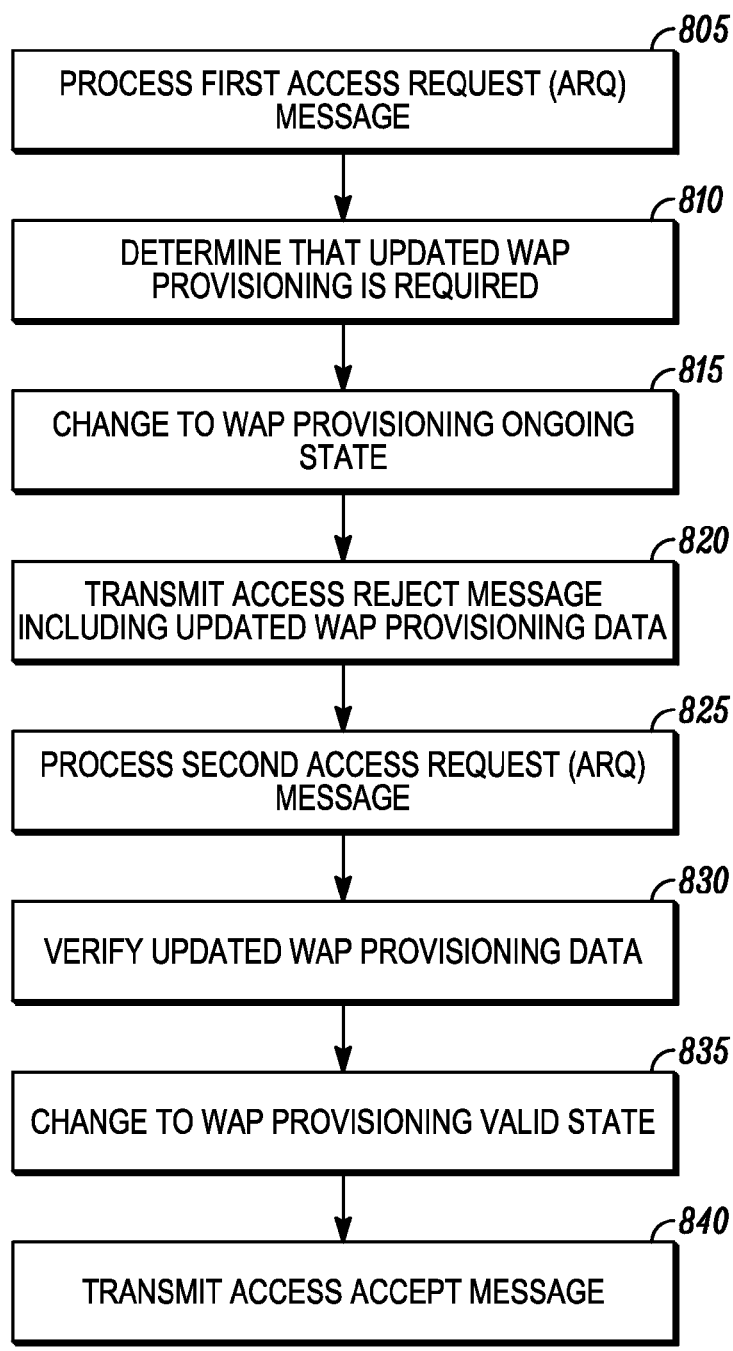
FIG. 8 is a general flow diagram illustrating a method for updating WAP data at an electronic communication device, from the perspective of an authentication, authorization, and accounting server, according to some embodiments of the present invention.

Referring to FIG. 8, a general flow diagram illustrates a method 800 for updating wireless application protocol data at an electronic communication device, from the perspective of an authentication, authorization, and accounting (AAA) server, according to some embodiments of the present invention. At step 805, the authentication, authorization, and accounting server processes a first access request message identifying the electronic device. At step 810, the authentication, authorization, and accounting server determines that the electronic device requires updated wireless application protocol provisioning. At step 815, a state of the authentication, authorization, and accounting server is changed from a wireless application protocol provisioning valid state to a wireless application protocol provisioning ongoing state, in response to determining that the electronic device requires updated wireless application protocol provisioning.

At step 820, an access reject message including updated wireless application protocol provisioning data is transmitted from the authentication, authorization, and accounting server, in response to the first access request message. At step 825, the authentication, authorization, and accounting server processes a second access request message that identifies the electronic device and includes the updated wireless application protocol provisioning data.

At step 830, the authentication, authorization, and accounting server verifies the updated wireless application protocol provisioning data included in the second access request message. At step 835, the authentication, authorization, and accounting server changes the state of the authentication, authorization, and accounting server from the wireless application protocol provisioning ongoing state to a wireless application protocol provisioning valid state. Finally, at step 840, the authentication, authorization, and accounting server transmits an access accept message. Steps 830, 835 and 840 are performed in response to the second access request message.

Figure 9:
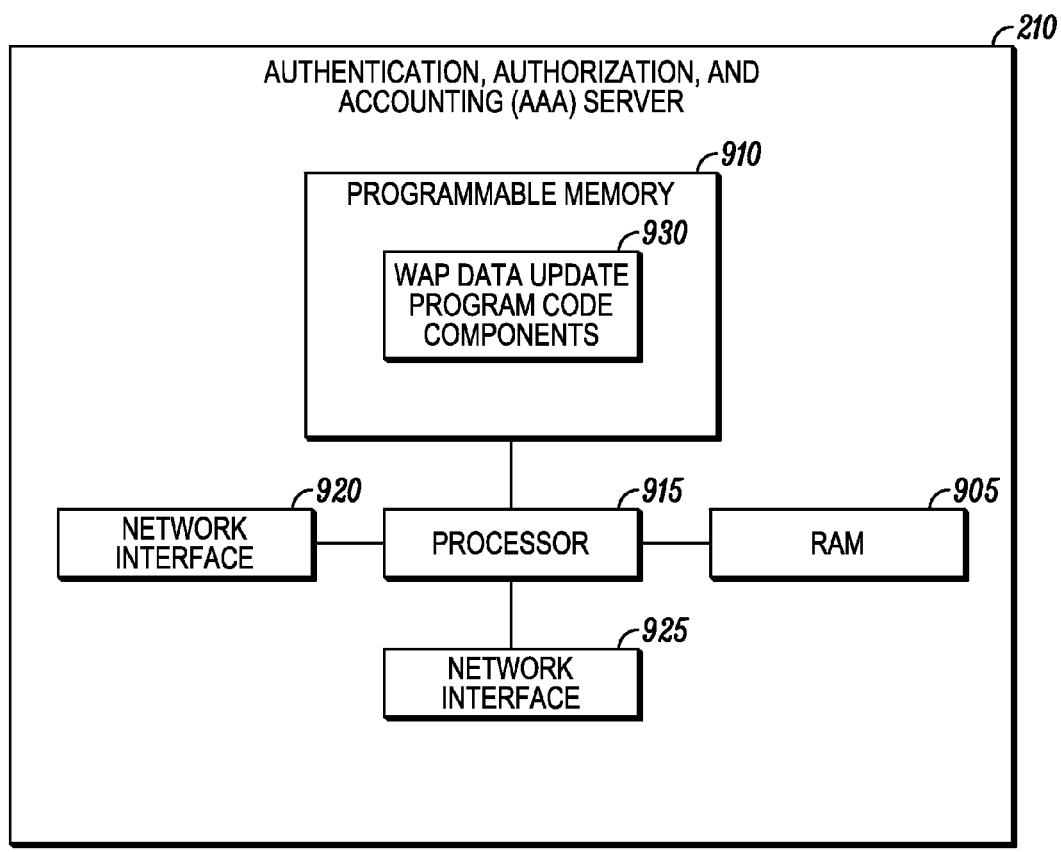
FIG. 9 is a block diagram illustrating components of an authentication, authorization, and accounting (AAA) server, according to some embodiments of the present invention.

Referring to FIG. 9, a block diagram illustrates components of the authentication, authorization, and accounting (AAA) server 210, according to some embodiments of the present invention. In this specification, references to AAA servers should be interpreted broadly to include any type of wireless network device that performs some or all of the conventional functions of code division multiple access (CDMA) network authentication, authorization, and accounting servers. The AAA server 210 comprises a random access memory (RAM) 905 and a programmable memory 910 that are coupled to a processor 915. The processor 915 also has ports for coupling to wireless network interfaces 920, 925. The wireless network interfaces 920, 925 can be used to enable the AAA server 210 to communicate with other network elements. For example, the AAA server 210 can communicate with PDSN/FA 220 and the home agent (HA) 260 using the wireless network interfaces 920, 925 to receive and transmit data packets.

The programmable memory 910 can store operating code (OC) for the processor 915 and code for performing functions associated with the AAA server 210. For example, the programmable memory 910 can comprise WAP data updating computer readable program code components 930 configured to cause execution of a method for updating wireless application protocol data at an electronic communication device as described herein.

Advantages of the present invention thus include enabling WAP provisioning to occur directly between a mobile node (MN) and a AAA server at an internet protocol (IP) layer. There is therefore no need to deploy network elements such as trusted provisioning servers (TPS), push proxy elements, bootstrap servers, and multimedia messaging service (MMS) proxy-relays. Further, some embodiments of the present invention enable a more efficient method for provisioning WAP settings over the air without interaction from network users. Network operators are therefore able to dynamically reconfigure WAP settings of electronic communication devices operating in their network. Also, the method can be easily launched from foreign networks that obtain permission from a home network, and there is generally no need to solicit assistance from device applications, such as those used in conventional OMA WAP provisioning procedures.

It will be appreciated that embodiments of the invention described herein may be comprised of one or more conventional processors and unique stored program instructions that control the one or more processors to implement, in conjunction with certain non-processor circuits, some, most, or all of the functions of updating wireless application protocol (WAP) data at an electronic device as described herein. The non-processor circuits may include, but are not limited to, a radio receiver, a radio transmitter, signal drivers, clock circuits, power source circuits, and user input devices. As such, these functions may be interpreted as steps of a method for updating wireless application protocol (WAP) data at an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

We claim:

1. A method for updating wireless application protocol data at an electronic communication device, the method comprising:

processing at a packet data serving node a first registration request message received from the electronic communication device;

transmitting from the packet data serving node to an authentication, authorization, and accounting server, in response to the first registration request message, a first access request message;

transmitting from the packet data serving node to the electronic communication device a first registration response message, in response to an access rejection by the authentication, authorization, and accounting server of the first registration request message, wherein the first registration response message comprises wireless application protocol provisioning data for updating the wireless application protocol data at the electronic communication device; wherein the wireless application protocol provisioning data comprises data selected from: a session internet home page address, a session proxy address, a multimedia messaging service center address, a user name, a password, a gateway authentication type, a gateway internet protocol address, a gateway service type, a gateway primary port identification, a first gateway port identification, and a second gateway port identification;

processing at the packet data serving node a second registration request message received from the electronic communication device;

transmitting from the packet data serving node to the authentication, authorization, and accounting server, in response to the second registration request message, a second access request message; and transmitting from the packet data serving node to the electronic communication device, in response to an acceptance of the second access request message, a second registration response message, wherein the second registration response message indicates that a mobile internet protocol registration process for the electronic communication device was successful.

2. The method of claim 1, wherein the electronic communication device is operatively connected to a code division multiple access radio transmission technology network or to an evolution-data optimized network.

3. The method of claim 1, wherein the packet data serving node forwards to a home agent the second registration request message, after receiving an access accept message from the authentication, authorization, and accounting server in response to the second access request message.

4. The method of claim 3, wherein the home agent transmits an access request message to the authentication, authorization, and accounting server in response to receiving the second registration request message.

5. The method of claim 3, wherein the packet data serving node received the second registration response message from the home agent in response to forwarding the second registration request message.

6. The method of claim 1, wherein the packet data serving node functions as a foreign agent for the electronic communication device.

7. The method of claim 1, wherein the first registration response message includes critical vendor/organization-specific extensions.

8. The method of claim 1, wherein the second registration request message includes the wireless application protocol provisioning data.

9. The method of claim 1, wherein the authentication, authorization and accounting server changes from a wireless application protocol provisioning valid state to a wireless application protocol provisioning ongoing state in response to the first access request message.

10. An intermediate network device for updating wireless application protocol data at an electronic communication device, the intermediate network device comprising: a memory; a processor coupled to the memory, the processor configured to: process a first registration request message received from the electronic communication device; transmit a first access request message to an authentication, authorization, and accounting server, in response to the first registration request message; transmit a first registration response message to the electronic communication device, in response to an access rejection by the authentication, authorization, and accounting server of the first registration request message, wherein the first registration response message comprises wireless application protocol provisioning data for updating the wireless application protocol data at the electronic communication device; wherein the wireless application protocol provisioning data comprises data selected from: a session internet home page address, a session proxy address, a multimedia messaging service center address, a user name, a password, a gateway authentication type, a gateway internet protocol address, a gateway service type, a gateway primary port identification, a first gateway port identification, and a second gateway port identification; process a second registration request message received from the electronic communication device; transmit a second access request message to the authentication, authorization, and accounting server, in response to the second registration request message, a second access request message; and transmit a second registration response message to the electronic communication device, in response to an acceptance of the second access request message, wherein the second registration response message indicates that a mobile internet protocol registration process for the electronic communication device was successful.

11. The intermediate network device of claim 10, wherein the electronic communication device is operatively connected to a code division multiple access radio transmission technology network or to an evolution-data optimized network.

12. The intermediate network device of claim 10, wherein the intermediate network device forwards to a home agent the second registration request message, after receiving an access accept message from the authentication, authorization, and accounting server in response to the second access request message.

13. The intermediate network device of claim 12, wherein the home agent transmits an access request message to the authentication, authorization, and accounting server in response to receiving the second registration request message.

14. The intermediate network device of claim 12, wherein the intermediate network device received the second registration response message from the home agent in response to forwarding the second registration request message.

15. The intermediate network device of claim 10, wherein the intermediate network device functions as a foreign agent for the electronic communication device.

16. The intermediate network device of claim 10, wherein the second registration request message includes the wireless application protocol provisioning data.

17. The intermediate network device of claim 10, wherein the authentication, authorization and accounting server changes from a wireless application protocol provisioning valid state to a wireless application protocol provisioning ongoing state in response to the first access request message.

18. An authentication, authorization, and accounting server for updating wireless application protocol data at an electronic communication device, the authentication, authorization, and accounting server comprising: a memory; a processor coupled to the memory, the processor configured to: process a first access request message identifying the electronic device; determine that the electronic device requires updated wireless application protocol provisioning; change a state of the authentication, authorization, and accounting server from a wireless application protocol provisioning valid state to a wireless application protocol provisioning ongoing state, and transmit an access reject message including updated wireless application protocol provisioning data, in response to the first access request message; wherein the wireless application protocol provisioning data comprises data selected from: a session internet home page address, a session proxy address, a multimedia messaging service center address, a user name, a password, a gateway authentication type, a gateway internet protocol address, a gateway service type, a gateway primary port identification, a first gateway port identification, and a second gateway port identification; process a second access request message identifying the electronic device and including the updated wireless application protocol provisioning data; and verify the updated wireless application protocol provisioning data included in the second access request message, change the state of the authentication, authorization, and accounting server from the wireless application protocol provisioning ongoing state to a wireless application protocol provisioning valid state, and transmit an access accept message, in response to the second access request message.

* * * * *